United States Patent Office 3,041,836
Patented July 3, 1962

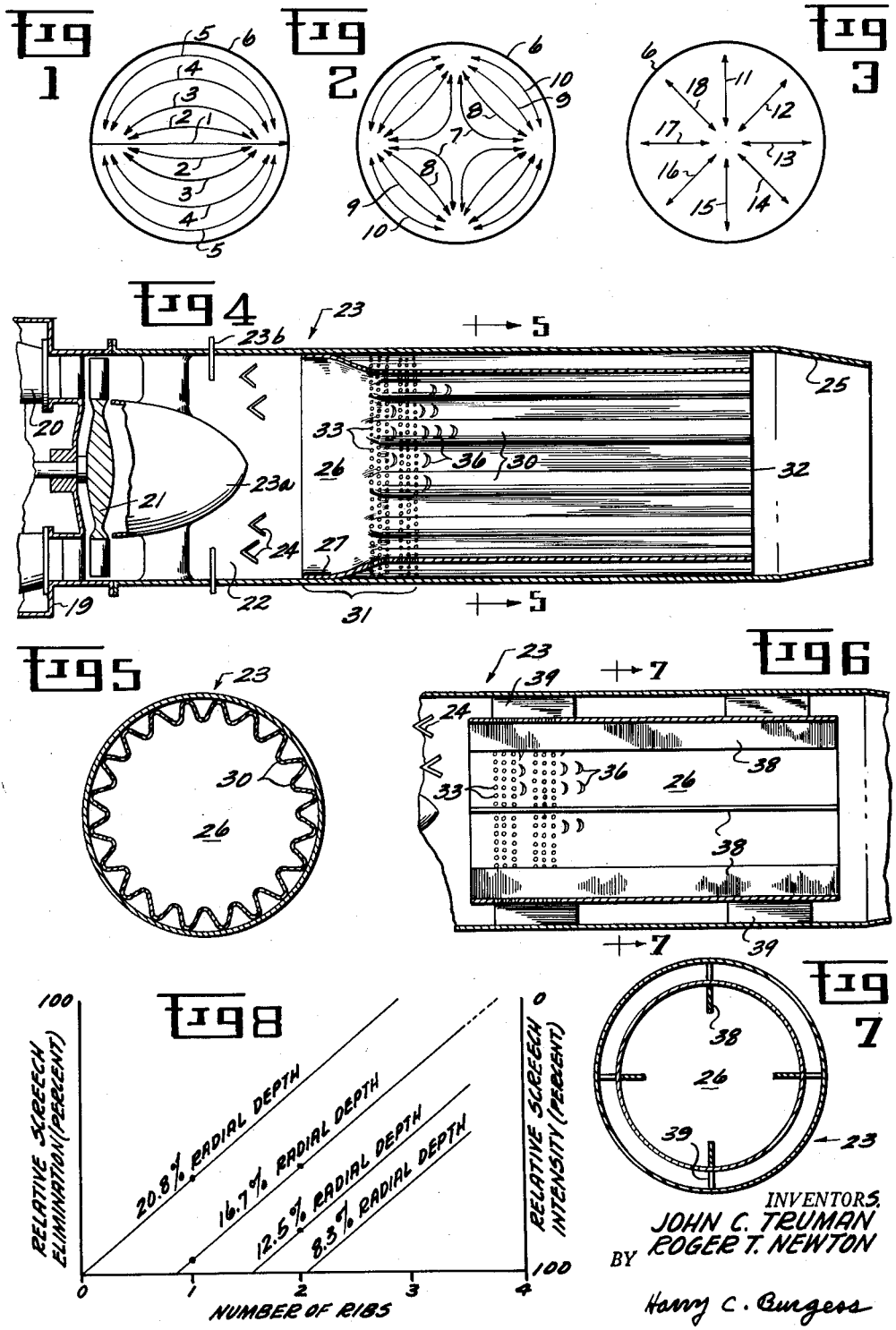

3,041,836
MEANS FOR ELIMINATING SCREECH IN JET PROPULSION SYSTEMS
John Carlton Truman, West Peabody, Mass., and Roger Tinkham Newton, Devon, Pa., assignors to General Electric Company, a corporation of New York
Continuation of abandoned application Ser. No. 391,589, Nov. 12, 1953. This application Sept. 11, 1959, Ser. No. 839,419
2 Claims. (Cl. 60—39.69)

Our invention, the application for which is a continuation of our application, Serial No. 391,589, filed November 12, 1953, now abandoned, for "Means and Methods for Eliminating Screech in Jet Propulsion Systems," relates to jet propulsion systems. More particularly, it relates to means for eliminating screech in jet propulsion systems.

The term "screech" has been applied, and is so applied herein, to intense high frequency pressure oscillations which, under certain conditions, accompany the combustion process in ducted burners, particularly those high performance burners such as ramjets, rockets, and afterburners or reheat burners. Characterized by frequencies of several thousand cycles per second or more, screech, which causes the noise by which it is known, can far exceed in acoustic intensity the so-called "threshold of pain." The intensity as far as 100 feet from a screeching burner has been measured as high as 130 decibels.

Aside from the discomfort which it may cause to personnel exposed to it, screech presents a very serious problem in its damage to equipment. Screech is sometimes encountered in a mild form, intermittent or steady, which may increase in intensity as operating parameters are changed. At other times it appears suddenly at high intensities. Screech is not a transient phenomenon but continues until some change is made in flow or combustion variables or both to shift the burner operation to a nonscreech range or until the combustor itself is destroyed by the vibrations or oscillations of the screech. The high energy level in these oscillations can render an afterburner of a jet propulsion engine unsafe through failure of parts in a few seconds.

The problem is made even more critical because the flow and combustion conditions under which screech will occur in any given system cannot be fully predetermined and avoided. Nor do these conditions remain constant over a period of time or from one given system to another similar system. In other words, if flow or combustion conditions are adjusted to eliminate screech, even at the expense of efficiency, a combustor may later screech in operation when but one of a number of conditions change. To insure safe operation without screech over the lifetime of a screech susceptible burner or combustor, positive means for preventing and eliminating screech are requisite.

Experimental work has established that screech does not occur in the absence of combustion and does not result from the flow of non-ignited fuel oxidizer mixtures through a duct or passageway. It has further been shown that screech is not caused by mechanical resonance of a combustor or of any physical component of the entire system, although mechanical resonance may affect the acoustic intensity of the screech.

The damaging intensity of screech is dependent on the cross-sectional dimensions and shape of the duct in which it occurs and to very little or no extent on its length. It has further been found that screech will occur in any duct susceptible to screech by reason of its geometric configuration or other factors so long as the length of the duct is about twice the diameter for a duct of circular cross-section.

As mentioned above, it is possible to vary the fluid flow and combustion characteristics of a particular burner to prevent screech. Among the factors which may be so varied are the burner length (if shortened to less than about 2 diameters), the flame holder blockage area and its disposition in the duct, the fuel injection location in relation to the flame holder used, the fluid inlet temperature, and the fluid inlet velocity. However, since each of the above variables is dependent to a greater or lesser extent upon all the other variables involved, changes which can occur in normal operation of a burner nullify such efforts to eliminate screech except on an experimental basis. Production jet propulsion systems for aircraft and other purposes must be constant and positive in performance. To attain this end they must be free of screech under all conditions.

Accordingly, an object of our invention is to provide means for rendering screech-free those parts of jet propulsion systems which are susceptible to screech.

Another object of our invention is to prevent the mechanical failure of jet propulsion systems due to pressure oscillations known as screech by eliminating this phenomenon.

Briefly, our invention comprises means for permanently preventing screech in jet propulsion systems by providing structure at the parts susceptible to screech which eliminates, prevents, or damps the pressure oscillations manifested in screeching.

The features of our invention, which we believe to be novel are set forth in particularity in the appended claims. Our invention itself, however, both as to its organization and method of operation, together with further effects and advantages thereof may best be understood by reference to the following description taken in connection with the accompanying drawings in which:

FIGS. 1 through 3 show various modes in which the screech oscillations may occur; and FIG. 4 is a longitudinal cross-sectional view of a part of a jet propulsion system illustrating the use of our invention; and FIG. 5 is a cross-sectional view of the jet propulsion system taken along lines 5—5 of FIG. 4; and FIG. 6 is a longitudinal cross-sectional view of a further embodiment of our invention; and FIG. 7 is a cross-sectional view taken along lines 7—7 of FIG. 6; and FIG. 8 is a graphic presentation of the effect of variations of the embodiment shown in FIGS. 6 and 7.

Referring to FIGS. 1 through 3, there are shown typical paths or modes which the high frequency pressure oscillations may take in the afterburner of a jet engine. The circumferential and radial vibrations or oscillations shown by lines 1 through 5 in duct 6 of FIG. 1 are those encountered downstream of flameholders of the trough or gutter type which extend diametrically across the duct, here in a line corresponding to line 1. FIG. 2 shows a circumferential screech oscillation pattern in lines 7 through 10 which is typical of those obtained when flameholders having a generally circular shape are placed upstream of the duct 6, while FIG. 3 shows in lines 11 through 18 purely radial oscillations which may result from a use of a circular flameholder upstream.

It is quite obvious that pressure oscillations, such as those shown in FIGS. 1 through 3, unless prevented or damped before they reach a high destructive intensity, will cause failure of the mechanical structure of the duct in which they occur. Such an event would be serious enough in ground installations but disastrous in flying aircraft, both to personnel and equipment.

Shown in FIG. 4 is a partial longitudinal cross-sectional view of a jet system, such a system being typical of those jet propulsion devices or systems in which our invention may be utilized to advantage. Depicted partially at 19 is a pre-burner or what in an ordinary jet engine would be the main burner. Included in this burner are one or more combustors several of which are partially shown at 20 to which are fed fuel by means not shown which is mixed with air, ignited by usual means not shown, and burned, the combustion fluid passing downstream through a turbine 21 into plenum chamber or duct 22. In the usual jet engine, duct 22 would discharge directly into the ambient atmosphere through a nozzle 25. Screech is not normally encountered in the pre-burner or plenum chamber described above.

In order to augment the thrust of an ordinary jet engine, additional fuel is burned in a continuation of the exhaust system 22 or a separate similar duct placed downstream between the chamber 22 and the exhaust nozzle 25. In FIG. 4 this reheat or afterburning duct is shown generally at 23. Extra fuel is fed into duct 23 by any convenient or desired means, the injectors at 23b surrounding a diffuser 23a, being merely typical of such injectors, and ignited by conventional means not shown. It is normally necessary in afterburners to provide so-called flameholders 24 downstream of the fuel injectors 23b. As the name implies, the flameholders, in effect, by means of the fluid flow pattern created by their insertion in the duct 23 serve to hold the flame and prevent the latter from passing out through the nozzle 25 causing the combustible fluid in the duct to extinguish.

It is the region just downstream of the flameholders in which screech is initiated and maintained. As discussed heretofore, screech with its attendant high frequency pressure oscillations, which, besides causing personal discomfort because of its sound effects, causes very rapid failure of the mechanical structure of the duct or part in which it occurs, can be controlled or prevented by changing the various fluid flow parameters. However, varying these parameters does not afford a permanent preventive for screech since they vary in and of themselves during the operation of the engine. It is obvious that a pilot or an automatic control cannot continually adjust five or more variables to obviate screech which can destroy an engine and aircraft within a matter of several seconds. Normally the pilot or control would never be able to sense or even determine which parameter to adjust should screech occur while in the air before the aircraft would be destroyed.

It is apparent that permanent means must be used to prevent screech. Such means are provided in our invention in the form of permanent structural features for parts or ducts susceptible to screech which interrupt the building up of high intensity transverse, circumferential and/or radial pressure oscillations which are the mechanically destructive components of screech. If these vibrations or oscillations are interrupted in the formative stages they cannot build up to destructive intensities or potentials. No claim is made herein as to the muffling or reduction of normal noise in jet propulsion system.

We have devised means, illustrated in FIGS. 4 through 7, by which screech oscillations may be prevented, interrupted, or damped. It will be realized, however, that the application in this description of screech preventing means to the afterburner or reheat stage of a jet engine is typical only, such means being applicable as well to any of jet propulsion systems in general which may develop screech. The wall 27 of the liner is adapted to contain FIGS. 4 and 5 comprises a liner, indicated generally at 26, positioned inside that part of duct 23 susceptible to screech. The wall 27 of the liner is adapted to contain or support a series of radially inwardly directed projections. In the instant embodiment, the projections are in the form of a plurality of longitudinally-extending corrugations 30 formed integrally in the wall 27, as shown, or affixed thereto by any suitable means, such as welding or brazing. The corrugations may typically have an amplitude or height of less than two percent of the duct diameter inward and a pitch or peak-to-peak or trough-to-trough dimension of about six percent of the diameter of the duct. The corrugations begin in the forward portion of the liner, indicated generally at 31, and continue to the extreme rearward edge 32 thereof. It is to be understood that the exact dimensions of the corrugations and the number employed is not limited to that disclosed but rather is dependent on the range of screech frequencies likely to be encountered in the particular duct being utilized and, to a lesser extent, on the physical dimensions of the duct.

Located in or near the forward portion 31 of the liner are a series of perforations or holes 33 designed to cooperate with the projecting portions of the liner wall to prevent the build-up of the destructive screech pressure oscillations in the duct. As is true of the corrugations 30, the exact number, location, and spacing of the perforations is determined solely by the fact that oscillations of a certain frequency range will occur in a duct having particular dimensions. In liners having different geometrical configurations and different dimensions the number, size, and spacing of the perforations will vary, e.g., in one instance, a corrugated liner having less than fifteen percent of its total area perforated was found to be effective in eliminating screech. While we do not wish to be bound by any specific theory of operation, it is believed that the high-pressure transverse, circumferential and radial screech-causing oscillations shown in FIGS. 1 through 3 are prevented from building-up to damaging intensities by being interrupted by impingement upon the corrugations 30, which interfere with and diffusively reflect the oscillations, and by being broken up by passage through the perforations 33 of the liner.

While the liner should extend approximately the length of the duct 23, the spacing therefrom is not critical. However, it should not be placed so close to the center of the duct as to be adversely affected by the high temperatures prevalent there, i.e., we prefer to space the liner no more than ten percent of the cross-sectional dimension from the wall of duct 23. Typical materials for such a liner, as well as for other screech preventing structures, are stainless steel, Inconel, and other heat-resistant metals well known to those skilled in the art. In addition, a plurality of louvers, some of which are shown at 36, may be formed in the wall 27 of the liner to aid in cooling it. In some cases the louvers will extend the entire length of the liner depending on the temperatures expect to be encountered. It is to be understood that the louvers have no part in preventing the build-up of the screech-causing high intensity oscillations, but rather merely provide for cooling air flow immediately adjacent the interior side of liner wall.

In the embodiment of our invention shown in FIGS. 6 and 7, the projections in the liner wall take the form of vanes or ribs 38 extending radially inwardly of the liner 26 which, in this embodiment, is supported in the duct 23 by a plurality of partitions 39. The vanes may be integrally formed with the liner wall, or affixed thereto, in a similar manner to that used for the corrugations 30. The ribs, in cooperation with the perforations 33, serve to interrupt and interfere with the high-pressure oscillations to prevent their reaching destructive intensity levels in much the same manner as do the corrugations 30. We have found experimentally that odd or even numbers of ribs may be used with equal effect. In addition, we prefer to use four or more ribs so as to keep the radial depth at about fifteen percent of the transverse dimension of the duct to insure freedom from excessive rib temperature. The effect of ribs on screech is illustrated in FIG. 8 wherein the percent relative screech elimination and relative screech intensity for ribs of various indicated radial depths are plotted versus the number of ribs for a particular perforated duct liner twelve inches in diameter. It will be seen that three ribs of 20.8 percent radial depth of four ribs of 16.7 percent radial depth would be required for total elimination of screech. A greater number of ribs of lesser radial depth would also completely eliminate screech for this particular burner application.

By this invention we have provided means for effectively eliminating or suppressing screech in parts of jet propulsion systems susceptible to such phenomenon. Our screech elimination means, which is installed permanently in the system, is not affected by changes in the fluid flow characteristics of the system and eliminates destructive screech permanently and very simply.

While we have shown only particular embodiments of our invention, other modifications may occur to those skilled in the art. It is, therefore, to be understood that we intend by the appended claims to cover all such modifications and embodiments of our invention as fall within the true spirit and scope of the invention.

We claim:

1. In a jet propulsion system including a duct defining a combustion zone, screech-eliminating means mounted in the interior of said duct and extending approximately the length of the zone, said means comprising: a liner for said duct; a plurality of radially inwardly directed corrugations on the liner wall, said corrugations extending longitudinally substantially the length of said liner; and a series of perforations located in the forward portion in said liner, said corrugations and said perforations cooperating to prevent the build-up of high intensity transverse, circumferential and radial pressure oscillations without muffling or reducing the normal noise of burning.

2. In a jet propulsion system including a duct defining a combustion zone, screech-eliminating means mounted in the interior of said duct and extending approximately the length of the zone, said means comprising: a liner for said duct; a plurality of radially inwardly directed corrugations on the liner wall, said corrugations extending longitudinally substantially the length of said liner and having an amplitude of less than two percent of the duct diameter inwardly and a peak-to-peak or trough-to-trough dimension of approximately six percent of the duct diameter; and a series of perforations in said liner, said corrugations and said perforations cooperating to prevent the build-up of high intensity transverse, circumferential and radial pressure oscillations without muffling or reducing the normal noise of burning.

References Cited in the file of this patent

UNITED STATES PATENTS

| | | |
|---|---|---|
| 2,159,488 | Parkinson | May 23, 1939 |
| 2,486,019 | Goddard | Oct. 25, 1949 |
| 2,508,420 | Redding | May 23, 1950 |
| 2,652,127 | Johnston | Sept. 15, 1953 |
| 2,794,319 | Stockdale | June 4, 1957 |

FOREIGN PATENTS

| | | |
|---|---|---|
| 202,851 | Australia | Aug. 18, 1955 |
| 1,020,208 | Germany | Dec. 19, 1957 |

OTHER REFERENCES

"Aircraft Gas Turbine," John Wiley & Sons, Inc., New York, 1956, page 290.